Figure 1:
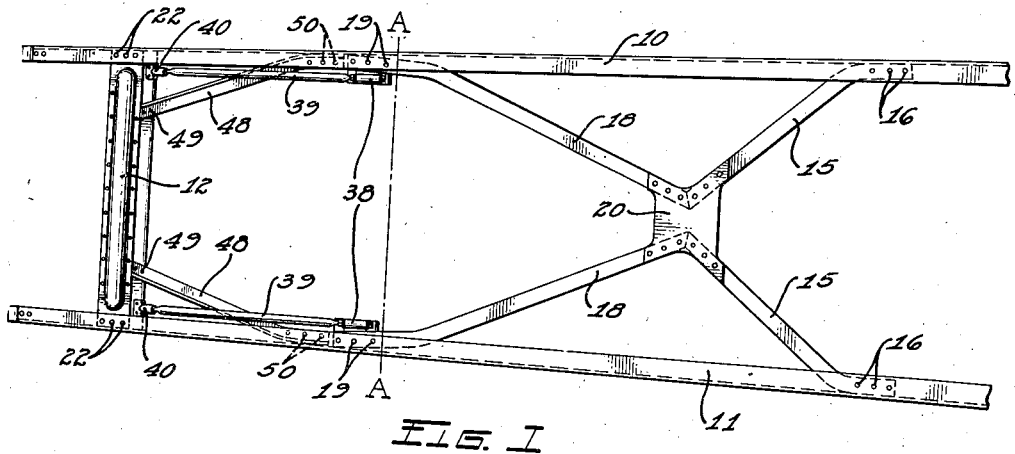

Oct. 7, 1941.  F. C. BEST  2,257,835

MOTOR VEHICLE

Filed Jan. 3, 1939

Inventor
FRANK C. BEST.
By Watson, Cole, Grinde & Gindle
Attorney

Patented Oct. 7, 1941

2,257,835

UNITED STATES PATENT OFFICE 2,257,835

MOTOR VEHICLE

Frank C. Best, Detroit, Mich., assignor to Packard Motor Car Company, Detroit, Mich., a corporation of Michigan Application January 3, 1939, Serial No. 249,130

14 Claims. (Cl. 280—106)

This invention relates to motor vehicles and has for its object the provision of a motor vehicle frame characterized by extreme strength and rigidity and by minimum weight. The several features of the invention are particularly important when the principles thereof are applied to the forward structure of the vehicle frame.

It is common practice at the present time to provide vehicle frames having longitudinally extending side frame members or sills with a generally centrally disposed X-frame construction connecting and reinforcing the side frame members, the forward portion of this X-frame construction being secured to the side frame members in the vicinity of the vehicle dash. It is also customary to provide a cross frame member adjacent the forward ends of the side frame members and extending transversely of the vehicle, this cross frame member being secured rigidly to the side frame members. It is found, however, that with this construction there is a certain amount of distortion occurring in the side frame members forwardly of the dash, these portions of the side frame members being subjected to bending moments acting in a generally vertical plane and resulting in upward deflection of the forward end of the frame. The degree of distortion can be reduced to some extent by direct reinforcement of the side frame members so as to provide a closed section which may be referred to as a box construction. However, such reinforcement obviously adds considerably to the weight of the forward end of the frame and does not eliminate the distortion.

It is therefore the specific object of the present invention to provide a frame construction in which this vertical deformation of the side frame members is reduced to a minimum or substantially eliminated and which will not materially affect the distribution of weight in the frame. In the preferred form of the invention a truss structure disposed in a generally vertical plane is provided adjacent the forward end of each side frame member, this structure including a compression strut extending upwardly and rearwardly and acting between the frame at a point adjacent the cross frame member and a point adjacent the vehicle dash.

It is a further object of the invention to provide an improved form of cross frame member which is particularly applicable to a vehicle frame employing the truss structures hereinbefore referred to, the cross frame member having minimum weight and exhibiting unusual resistance to flexure. Preferably the frame is further strengthened by the employment of compression struts associated with the cross frame and side frame members and acting in a generally horizontal plane.

Figure 2:
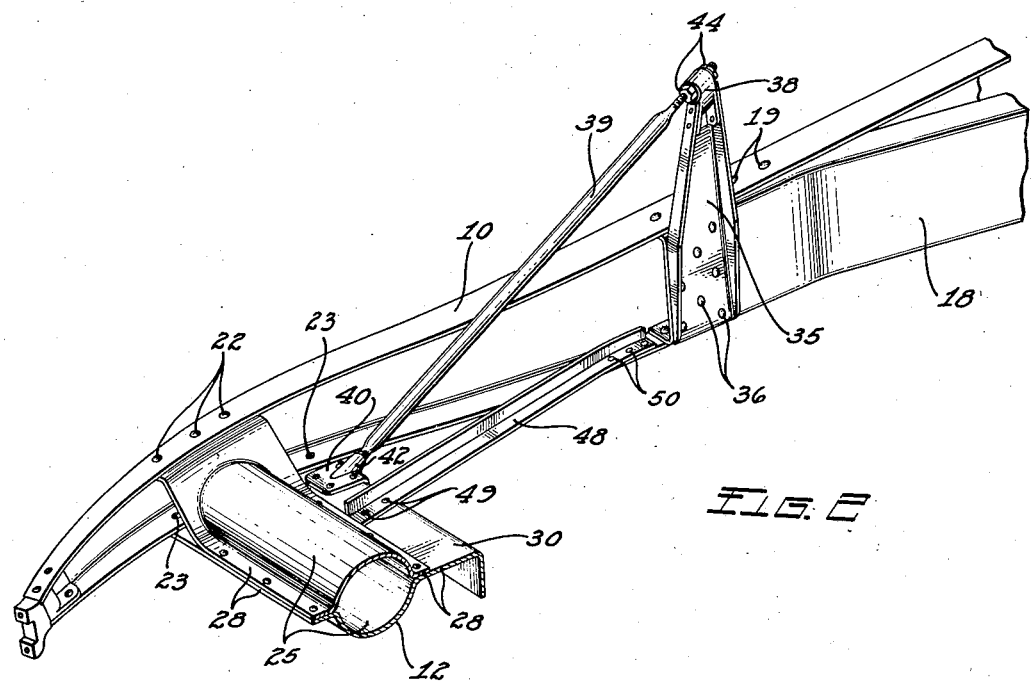

Further objects and features of the invention will be apparent from the following description taken in connection with the accompanying drawing, in which:

Figure 1 is a plan view of a portion of a vehicle illustrating the application of the invention thereto; and Figure 2 is a fragmentary view in perspective showing one side frame member, the adjacent end of the cross frame member, and the structural elements associated therewith.

In describing the invention reference will be made to the embodiment thereof selected for the purpose of illustration and specific language will be employed in order to facilitate an understanding of the invention. It will nevertheless be understood that no limitation of the scope of the invention is thereby intended, but that various alterations in the preferred construction may be made without departing from the principles of the invention as outlined in the appended claims.

In the drawing the side frame members are indicated at 10 and 11 respectively and the cross frame member at 12, the latter extending transversely of the frame adjacent the forward end thereof and being secured rigidly to the side frame members. The side frame members are further preferably united by an X-frame construction which may consist of the rearwardly directed structural elements 15 secured to the side frame members as at 16 and the forwardly directed structural elements 18 secured to the side frame members as at 19, the elements 15 and 18 being united adjacent the central portion of the vehicle by means of a plate 20 secured rigidly thereto. The elements 18 preferably extend forward of the dash, the usual position of the latter with respect to the frame being indicated diagrammatically by the line A—A.

As will be observed from Figure 2 of the drawing, the side frame members 10 and 11 are of the conventional channel section and the cross frame member 12 is formed in two sections, the upper section being secured to the upper flange of each side frame member as at 22 and the lower portion being secured to the lower flange of each side frame member as at 23. Both sections of the cross frame member 12 are pressed out to form substantially semi-cylindrical portions 25 having laterally extending flanges 28 formed thereon, these flanges being secured together by riveting or otherwise so that the finished member constitutes a hollow tube combining great rigidity with minimum weight. The rearwardly directed flange 28 of the lower section of the cross frame member 12 is extended beyond the body of the side frame member to provide a reinforcing angle portion 30 to further increase the strength of the member and to accommodate other members of the frame structure hereinafter referred to.

Although the form of cross frame member just described adds materially to the strength of the forward end of the frame and tends to prevent weaving, it will be appreciated that any vertical deformation of the side frame members forwardly of the X-frame construction must be resisted solely by these members. In accordance with the present invention additional structural means are provided whereby vertical stresses applied to the side frame members at this point are carried rearwardly to the central portions of the side frame members, which portions are extremely rigid by reason of the reinforcement thereof by the X-frame and by the vehicle body. This structural means preferably assumes the form of a truss, of which the forward portion of each side frame member may form a part. Thus upstanding channel members 35 may be secured to the side frame members adjacent to and immediately forward of the dash, for instance by being riveted as at 36 to the forward ends of the respective elements 18 of the X-frame structure. If desired, the channel members 35 may also extend beneath and be secured to the lower flange of each side frame member to afford additional strength. The upper end of each channel member 35 receives a bracket 38 which is in turn apertured to receive the rearward end of a brace member 39, the latter acting in the arrangement disclosed principally as a compression strut. The forward end of each member 39 is secured rigidly to a bracket 40, for instance by threading the member into a complementary socket in a boss 42 provided on the bracket, the latter being riveted or otherwise secured to both legs of the rearwardly directed angle flange 30 formed on the lower section of the cross frame member 12.

If desired, the member 39 may be adjustably supported in position so that the effective length thereof can be altered to ensure that stresses will be adequately resisted thereby. For instance, the rearward end of each member 39 may be threaded to receive nuts 44 engaging the bracket 38 on either side thereof.

The frame construction may be further strengthened by the provision of brace members 48 secured as at 49 and 50 to the cross frame member and to each side frame member respectively, these brace members acting principally as compression struts in a substantially horizontal plane to resist lateral bending of the forward end of the side frame members, it being observed that the angle flange 30 forms a convenient point of support for these members as well.

By means of this construction adequate strength is provided to resist deformation in any direction of the forward ends of the side frame members, upwardly directed stresses placing the struts 39 in compression so as to transmit the forces rearwardly to the strongest portion of the frame. It will be appreciated that in effect the brace members 39 act directly between points on the side frame members spaced in a longitudinal direction, connections being effected with these side frame members through the channel member 35 and the cross frame member 12 principally for convenience, it being essential only that some form of truss be disposed in a generally vertical plane so as to resist vertical flexure of the forward end of the frame.

While the invention is not limited to that type of frame employing an X-frame structure to reinforce the side frame members, the specific construction shown herein is most desirable since in the absence of such a structure the entire bending load is transmitted to the side frame members rearwardly of the channel members 35, thus subjecting the side frame members to undesirably high stresses.

Having thus described the invention, what is claimed as new and desired to be secured by Letters Patent is:

1. In a motor vehicle frame, the combination with generally longitudinally extending side frame members, of an X-frame structure extending between and secured to said side frame members, a transversely extending cross frame member secured to said side frame members near the forward ends of the latter, and structural means inclined with respect to the common plane of the side frame members and secured to and acting in compression between each side frame member and said cross frame member to resist upward bending of the forward ends of said side frame members.

2. In a motor vehicle frame, the combination with generally longitudinally extending side frame members, of an X-frame structure extending between and secured to said side frame members, and means including brace members inclined with respect to the common plane of the side frame members and acting under compression between longitudinally spaced points near the forward end of each side frame member for resisting vertical bending stresses to which the latter are subjected.

3. In a motor vehicle frame, the combination with generally longitudinally extending side frame members, of an X-frame structure extending between and secured to said side frame members, a transversely extending cross frame member secured to said side frame members near the forward ends of the latter, and brace members inclined with respect to the common plane of the side frame members, each of said brace members being rigidly connected to and acting in compression between said cross frame member and one of said side frame members.

4. In a motor vehicle frame, the combination with generally longitudinally extending side frame members, of an X-frame structure extending between and secured to said side frame members, a transversely extending cross frame member secured to said side frame members near the forward ends of the latter, and brace members inclined with respect to the common plane of the side frame members, each of said brace members being rigidly connected to and acting in compression between said cross frame member and one of said side frame members, each of said brace members extending rearwardly from said cross frame member and being disposed throughout the length thereof closely adjacent the vertical plane defined by the associated side frame member.

5. In a motor vehicle frame, the combination with longitudinally extending side frame members, of a cross frame member extending transversely between and secured rigidly to said side frame members, said cross frame member comprising a tubular body portion having a rearwardly directed flange, and compression struts acting between said flange and each of said side frame members to resist upward flexure of the latter.

6. In a motor vehicle frame, the combination with longitudinally extending side frame members, of a cross frame member extending transversely between and secured rigidly to said side frame members at the forward end of the latter, said cross frame member comprising separately formed sections having laterally curved portions united to form a continuous tubular structure extending between points closely adjacent each side frame member, one of said sections being provided with a laterally directed integrally formed flange, said flange having a portion lying in a plane substantially parallel to the plane of said vehicle frame and another portion lying in a plane intersecting said first plane at a substantial angle.

7. In a motor vehicle frame, the combination with longitudinally extending side frame members, of a cross frame member extending transversely between and secured rigidly to said side frame members at the forward end of the latter, said cross frame member comprising a tubular body portion having a rearwardly directed flange of a width comparable with the diameter of said tubular body portion, and generally horizontally disposed brace members secured to said flange and to the respective side frame members.

8. In a motor vehicle frame, the combination with longitudinally extending side frame members, of a transversely extending cross frame member secured to said side frame members near the forward ends of the latter, means forming with a portion of each side frame member adjacent and to the rear of said cross frame member a truss in a generally vertical plane to resist upward bending of the forward ends of the side frame members, and generally horizontal brace members secured to said cross frame member and to the respective side frame members.

9. In a motor vehicle frame, the combination with longitudinally extending side frame members, of a transversely extending cross frame member secured to said side frame members near the forward ends of the latter, and means forming with a portion of said side frame member adjacent said cross frame member a truss in a generally vertical plane to resist upward bending of the forward ends of the side frame members, said truss including upstanding brackets secured to each side frame member, and compression struts acting between the upper portion of each bracket and a point on the frame forward of the bracket.

10. In a motor vehicle frame, the combination with generally longitudinally extending side frame members, of a transversely extending cross frame member secured to said side frame members near the forward ends of the latter, and structural means secured to and acting in compression between each side frame member and said cross frame member to resist upward bending of the forward ends of said side frame members, said structural means including upstanding brackets secured to the side frame members adjacent to and forwardly of the vehicle dash, and compression struts secured to each bracket and to said cross frame member adjacent the associated side frame member.

11. In a motor vehicle frame, the combination with generally longitudinally extending side frame members, of a transversely extending cross frame member secured to said side frame members near the forward ends of the latter, and structural means secured to and acting in compression between each side frame member and said cross frame member to resist upward bending of the forward ends of said side frame members, said structural means including upstanding brackets secured to the side frame members adjacent to and forwardly of the vehicle dash, compression struts secured to each bracket and to said cross frame member adjacent the associated side frame member, and generally horizontal struts secured to and acting between said cross frame member and each side frame member.

12. In a motor vehicle frame, the combination with longitudinally extending side frame members, of means rigid with each side frame member adjacent the forward ends thereof and forming with a portion of the associated side frame member a generally vertically disposed truss, said means including compression struts, and means for adjusting the effective length of said struts.

13. In a motor vehicle frame, the combination with longitudinally extending side frame members having upper and lower inwardly directed flanges, of a cross frame member extending transversely between and secured rigidly to said side frame members, said cross frame member comprising a tubular body portion having a rearwardly directed flange disposed substantially in the plane of one of the flanges of each side frame, and generally horizontally disposed brace members secured to said last named flange and to the respective coplanar flanges of the side frame members.

14. In a motor vehicle frame, the combination with longitudinally extending side frame members, of a cross frame member extending transversely between and secured rigidly to said side frame members adjacent the forward end of the latter, said cross frame member comprising a tubular body portion having a rearwardly directed flange, said flange having a substantially horizontal portion of a width comparable with the diameter of said tubular body portion and having another portion lying in a plane making a substantial angle with the horizontal.

FRANK C. BEST.